United States Patent [19]
Saito et al.

[11] Patent Number: 5,299,049
[45] Date of Patent: Mar. 29, 1994

[54] BEAM SHIFTING DEVICE

[75] Inventors: Takayuki Saito; Masami Yoneda, both of Omiya, Japan

[73] Assignee: Fuji Photo Optical Co., Ltd., Saitame, Japan

[21] Appl. No.: 55,016

[22] Filed: Apr. 30, 1993

[30] Foreign Application Priority Data

Apr. 30, 1992 [JP] Japan ................................. 4-137871

[51] Int. Cl.$^5$ ............................................. G02B 26/08
[52] U.S. Cl. .................................. 359/196; 359/202; 359/211
[58] Field of Search ............... 359/196, 201, 202, 209, 359/210, 211, 221, 43, 76; 356/73; 372/20, 42; 33/533

[56] References Cited

U.S. PATENT DOCUMENTS

| | | | |
|---|---|---|---|
| 3,762,793 | 10/1973 | Ullstig | 359/202 |
| 3,909,104 | 9/1975 | Menke | 359/211 |
| 4,850,686 | 7/1989 | Morimoto et al. | 359/196 |

Primary Examiner—Loha Ben
Attorney, Agent, or Firm—Keck, Mahin & Cate

[57] ABSTRACT

A beam shifting device for directing a beam toward a fixed point of an object has instance vertical and horizontal beam shift elements, such as transparent optical plates with parallel surfaces positioned in an intended optical path. The vertical beam shift parallel plate is able to turn about a horizontal axis perpendicular to the optical axis for vertically shifting the beam upward and downward. The horizontal beam shift parallel plate, positioned in parallel with the vertical beam shift parallel plate, is able to turn about a vertical axis perpendicular to the optical axis for horizontally shifting the beam left and right. A controller detects vertical and horizontal deviations of the beam based on a distribution pattern of relative luminous energy of the beam diverged onto a spatial plane perpendicular to the intended path and drives the vertical and horizontal beam shift parallel plates to cancel the vertical and horizontal deviations of the beam, respectively.

5 Claims, 7 Drawing Sheets

BEAM SHIFTING DEVICE

BACKGROUND OF THE INVENTION

1. Field of the Invention

This invention relates to a beam shifting device for shifting a beam so as to direct it exactly toward a fixed object.

2. Description of Related Art

Lasers, which are used as light sources for various kinds of optical apparatuses, such as exposure apparatuses and holographic apparatuses, generate beams having a strong directivity. However, even such a laser beam suffers what is called a "beam shift," which are attributed to internal causes, such as thermal changes, and external causes, such as thermal stress, in association with a resonator. The term "beam shift" as used herein shall mean and refer to a parallel deviation of a laser beam from an intended beam path.

Typically, in order to cancel a beam shift from an intended beam path, a double mirror beam shifting device is well known in the art, as shown by an example in FIG. 8. This device has two reflection mirrors 100 and 101 with normal lines of their reflection surfaces intersecting at right angle, which are oscillated so as to direct a light beam Lb travelling from a light source 102, such as a laser, toward a fixed object 104. Such a device is usually provided with ne or more slits 103a and 103b in the intended optical path Ox. If the laser beam Lb shifts or deviates from the intended optical path Ox, the mirrors 101 and 102 must be cooperatively regulated in angle relative to the light beam Lb. Such cooperative angular regulation of the mirrors 101 and 102 is very difficult. In addition, since the shift or deviation of light beam Lb is not parallel with the intended optical path Ox, regulation of the mirror 101 for making a light beam Lb pass through the upstream slit 103a neither allows the light beam Lb to pass the downstream slit 103b nor directs it perpendicularly to the object 104.

SUMMARY OF THE INVENTION

It is, therefore, an object of the present invention to provide a beam shifting device which causes a parallel shift of a laser beam so that the laser beam travels toward an object in an intended beam path.

The forgoing object is accomplished by providing a beam shifting device for directing a light beam toward a fixed object placed in an optical axis. The beam shifting device has two, for instance first or vertical and second or horizontal, beam shift means, such as transparent optical plates, each having parallel surfaces (which are hereafter referred to as parallel plates for simplicity), positioned in the optical axis, i.e. an intended beam path. The vertical beam shift means, or parallel plate, is able to turn about a horizontal axis perpendicular to the optical axis for causing vertical shifting of a beam upward and downward. The horizontal beam shift means, or parallel plate, positioned in parallel with the vertical beam shift means, is able to turn about a vertical axis perpendicular to the optical axis for causing horizontal shifting of the beam left and right. A control means detects a parallel shift of beam in vertical and horizontal directions based on a distribution of relative luminous energy of the beam diverged onto a spatial plane perpendicular to the optical axis and drives the vertical and horizontal beam shift means to cancel the beam shift. The distribution of relative luminous energy of beam is detected by means of, for example, a plurality of photoelectric sensors placed in the spatial plane.

Specifically, the control means is designed and adapted to recognize vertical and horizontal directions of a beam shift from the optical axis and turn the vertical and horizontal beam shift means so as to cause a parallel beam shift in vertical and horizontal directions opposite to the recognized vertical and horizontal directions in feedback control.

BRIEF DESCRIPTION OF THE DRAWINGS

The above and other objects and features of the present invention will be clearly understood from the following detailed description with respect to a preferred embodiment thereof when considered in conjunction with the accompanying drawings, in which.

DETAILED DESCRIPTION OF THE PREFERRED EMBODIMENT

Figure 1:
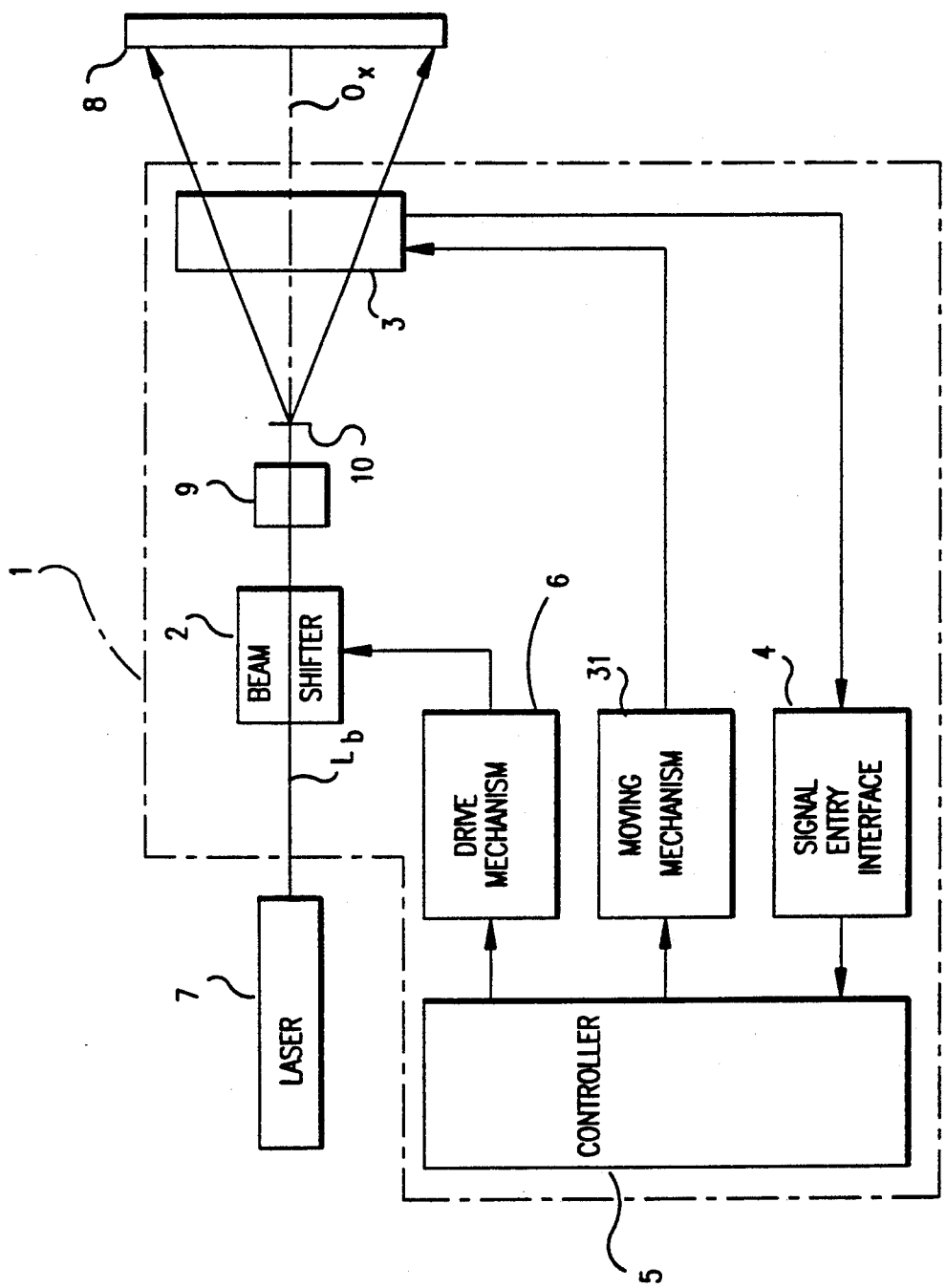
FIG. 1 is a schematic block diagram showing a beam shifting device in accordance with a preferred embodiment of the present invention.

Referring to the drawings in detail, in particular, to FIG. 1, a beam shifting device in accordance with a preferred embodiment of the present invention is shown in block diagram, which is disposed between a laser 7 and an object 8. The beam shifting device 1 includes a beam shifter 2, a diverging lens 9, a spatial filter 10 and a luminous energy distribution sensor 3 in an optical axis Ox, which is identical with an intended beam path, in order from the laser 7 toward the object 8. The luminous energy distribution sensor 3 monitors the distribution of relative luminous energy thereon. The beam shifter 2 is driven by means of a drive means 6 consisting of two separate drive mechanism 6A and 6B, which includes reversible electric motors 61A and 61B, respectively, so as to cause two dimensional parallel shifting of a beam Lb incident thereupon, as will be described in detail later. Driving of the beam shifter 2 is feedback controlled by a controller 5, such as a central processing unit (CPU), in accordance with the luminous energy distribution detected by the luminous energy distribution sensor 3. The luminous energy distribution sensor 3 provides control signals representative of vertical and horizontal directions, respectively, in which a beam is shifted from the optical axis Ox, to the controller 5 via a signal entry interface 4. The luminous energy distribution sensor 3 is moved into and out of the optical axis Ox by means of a moving mechanism 31 as necessary. Otherwise, the luminous energy distribution sensor 3 may be stationarily disposed out of the optical axis Ox. In this instance, a beam splitter (not shown) is disposed in the optical path Ox so as to split a beam into two parts and direct one part to the object 8 and the other part to the luminous energy distribution sensor 3 disposed out of the optical axis Ox.

Figure 2:
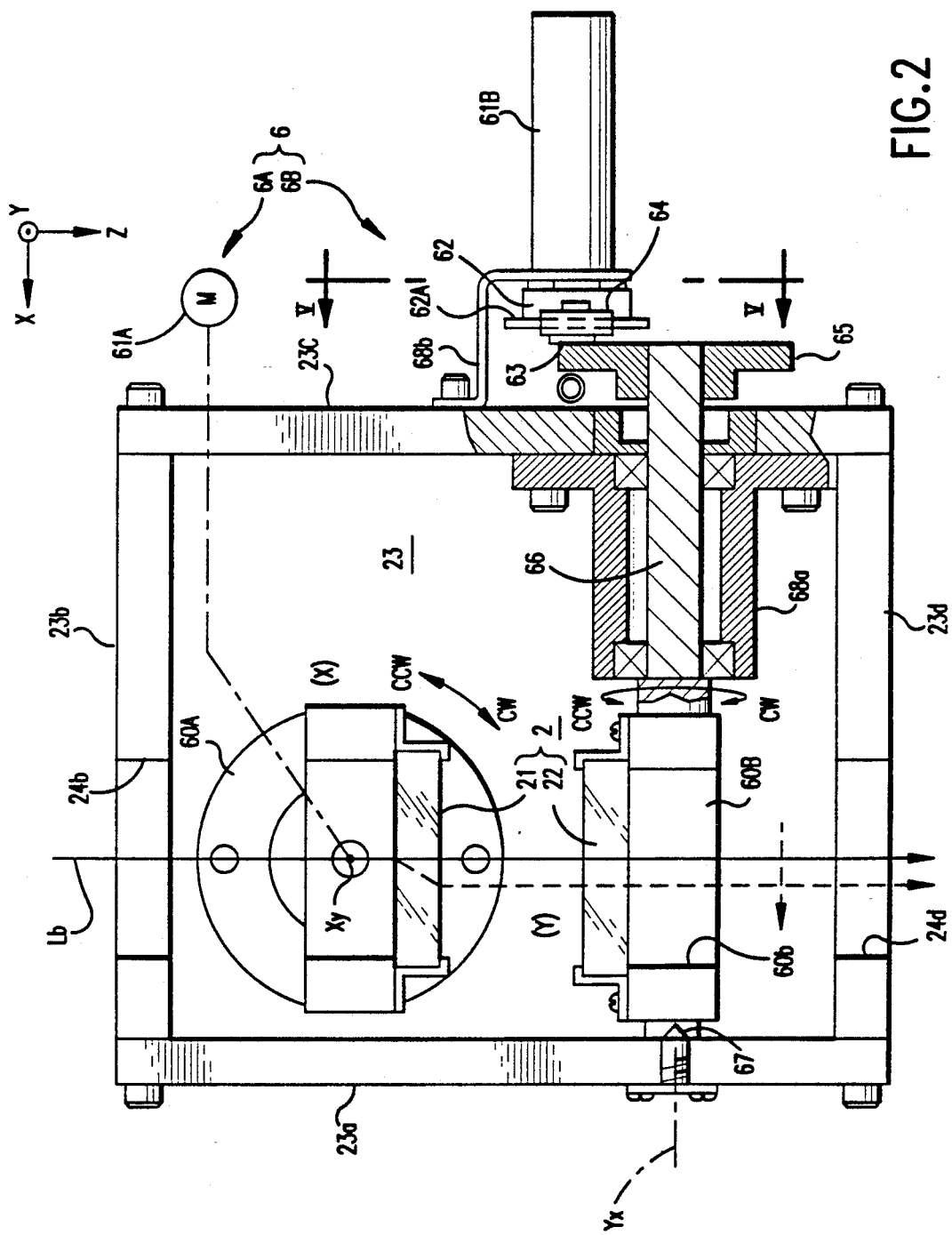
FIG. 2 is a plan view, partly in cross-section, of a beam shifter of the beam shifting device.
Figure 3:
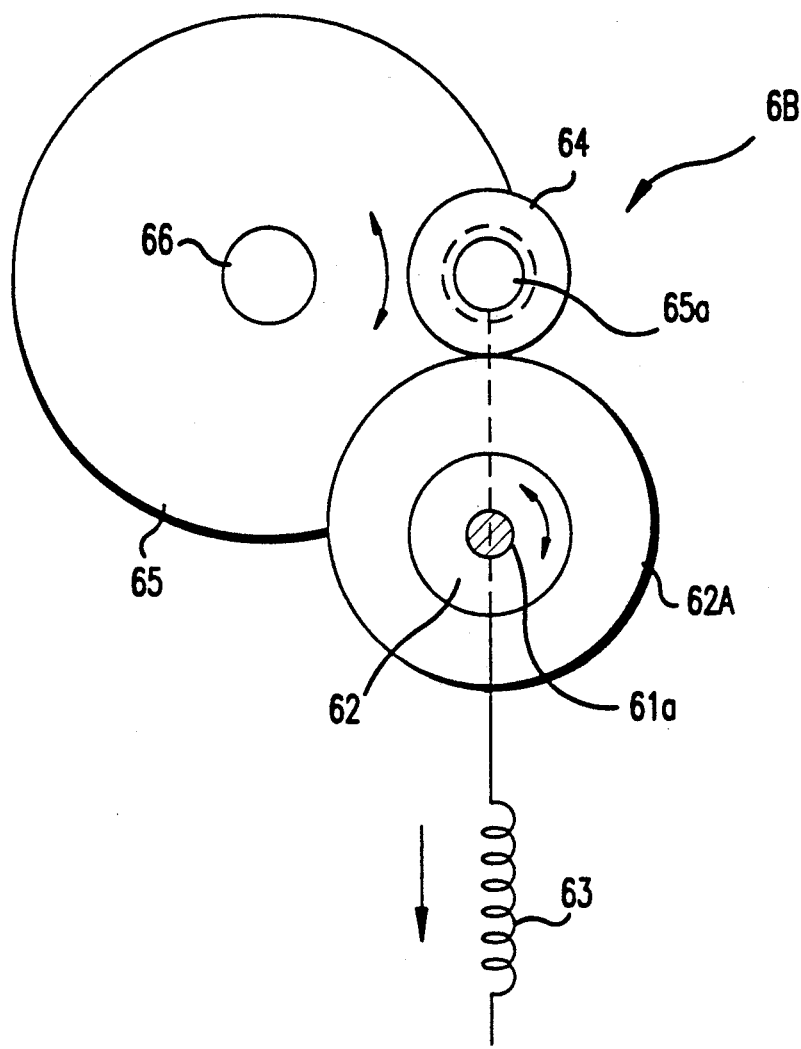
FIG. 3 is a cross-sectional view of FIG. 2 as seen along line V—V.

Referring to FIGS. 2 and 3, the beam shifter 2 has horizontal and vertical beam shift means 21 and 22, such as transparent parallel plates made of optical glass, each of which has an index of refraction n and an axial thickness, or axial distance between its parallel surfaces, d. Optical center axes of the horizontal beam shift means 21 and the vertical beam shift means 22 are in alignment with the optical axis Ox. The horizontal beam shift means 21 is able to turn about a vertical axis Xy perpendicular to the optical axis Ox. On the other hand, the vertical beam shift means 22 is able to turn about a horizontal axis Yx perpendicular to the optical axis Ox. The beam shifter 2 is mounted on a basement 23, framed by side walls 23a-23d, stationarily positioned between the laser 2 and the object 8 but out of the optical axis Ox. The side walls 23b and 23d are formed with openings 24b and 24d, respectively, through which a beam passes. The horizontal beam shift means 21 is fixedly mounted on and extends vertically from a turn table 60A having a center axis of rotation Xy extending in the Y-direction which is vertical relative to an X-Z plane, i.e. the same plane as the surface of the drawing and intersects perpendicularly the optical axis Ox. On the other hand, the vertical beam shift means 22 is held by a swing table 60B formed with an opening 60b which has a center axis of swing Yx extending in the X-direction in parallel with the X-Z plane and intersects perpendicularly the optical axis Ox.

The swing table 60B is connected on its one side to a rotary shaft 66 of a drive mechanism 6B of the drive means 6 supported for rotation by a cylindrical bush 68a secured to the side wall 23c of the framed basement 23 and supported on its opposite side by a stationary pivot 67 secured to the side wall 23a of the framed basement 23. Axes of the rotary shaft 66 and the stationary pivot 67 are coaxial with the axis of swing Yx of the swing table 60B. The drive mechanism 6B has an electric reversible motor 61B supported by a bracket 68b, secured to the side wall 23c of the framed basement 23, operationally coupled to a circular disk 65 secured to an external end of the rotary shaft 66. The reversible motor 61B is provided with a circular disk 62 secured to the rotary shaft 61a. A circular cam disk 62A, i.e. an eccentric cam disk, is secured to, or otherwise integrally formed with, the disk 62 so as to be eccentric relative to the disk 62 with respect to the rotary shaft 61a. Between the circular cam disk 62A and the circular disk 65 there is provided a interim disk, or cam follower disk 64 which is mounted for rotation on a shaft 65a secured to the circular disk 65 and held in frictional contact with the circular cam disk 62A by means of a tension spring 63. As the reversible motor 61B turns in one direction, the cam follower disk 64 moves up or down rolling along the periphery of the eccentric cam disk 62A, so as to turn the circular disk 65 along with the rotary shaft 66, thereby swinging the swing table 60B about the center axis of swing Yx. The turn table 60A is driven by the drive mechanism 6A of the drive means 6, only shown schematically, which is similar in structure to the drive mechanism 6B. However, the rotary shaft 66 of the drive mechanism 6A is provided vertically and operationally coupled directly, or otherwise through an interim roller disk, to the turn table 60A about the center axis of rotation Xy. In the same manner as the drive mechanism 6B, as the reversible motor 61B of the drive mechanism 6A turns in one direction, the turn table 60A is turned about the center axis of rotation Xy.

Figure 4:
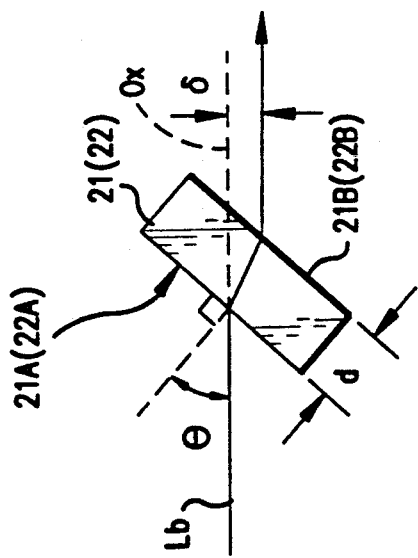
FIG. 4 is an illustration showing a geometric optical function of a beam shift means used in the beam shifter.

Referring to FIG. 4, each of the horizontal and vertical beam shift means 21 and 22 has an effect that is called "time shearing" in which the axis of a beam Lb incident upon each of the horizontal and vertical beam shift means 21 and 22 at an angle Θ is laterally shifted in parallel with a straight line Ox extended from the axis by a lateral deviation δ. The lateral deviation δ is expressed as follows when sin Θ is approximated nearly to Θ:

$$\delta = [(n-1) \, d/n] \, \Theta$$

Figure 5:
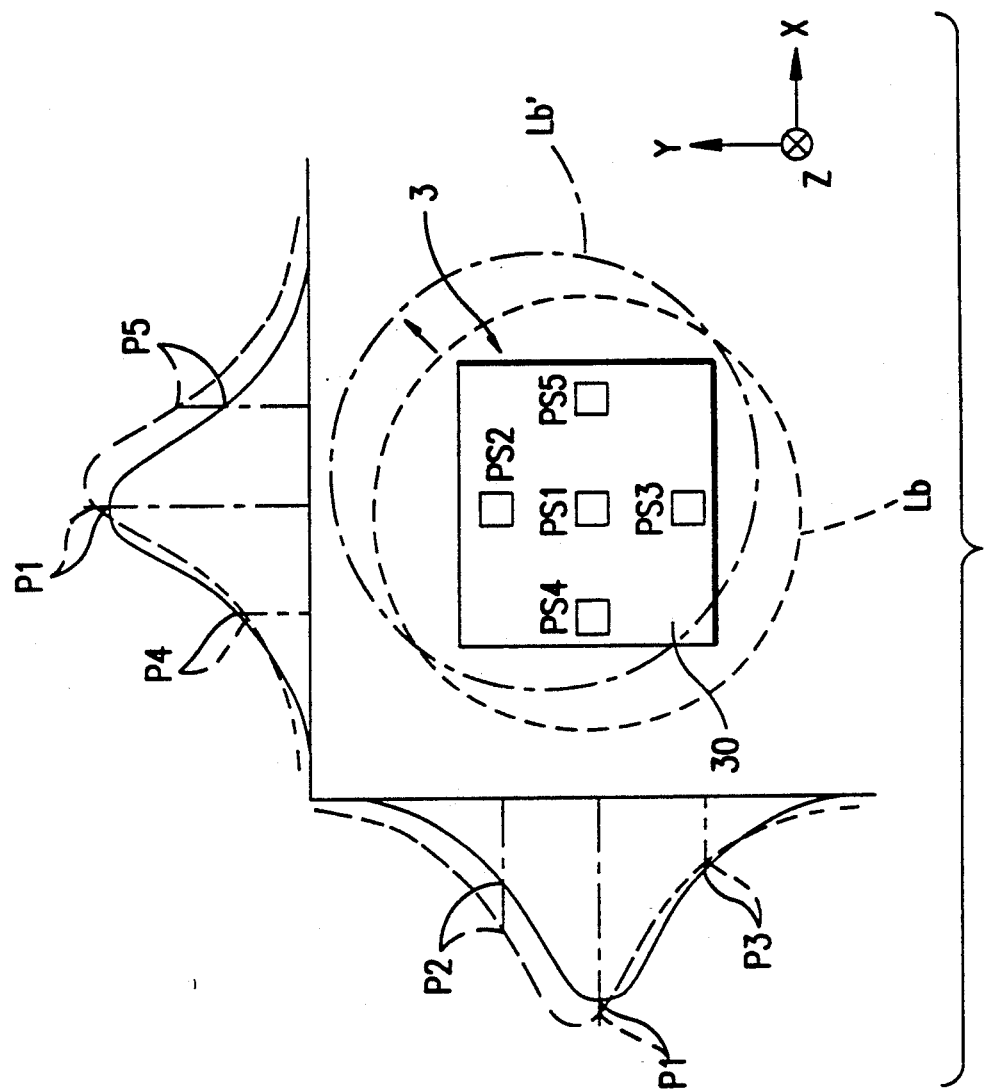
FIG. 5 is a front view of a luminous energy distribution detecting means for detecting a distribution pattern of relative luminous energy of a beam.
Figure 6:
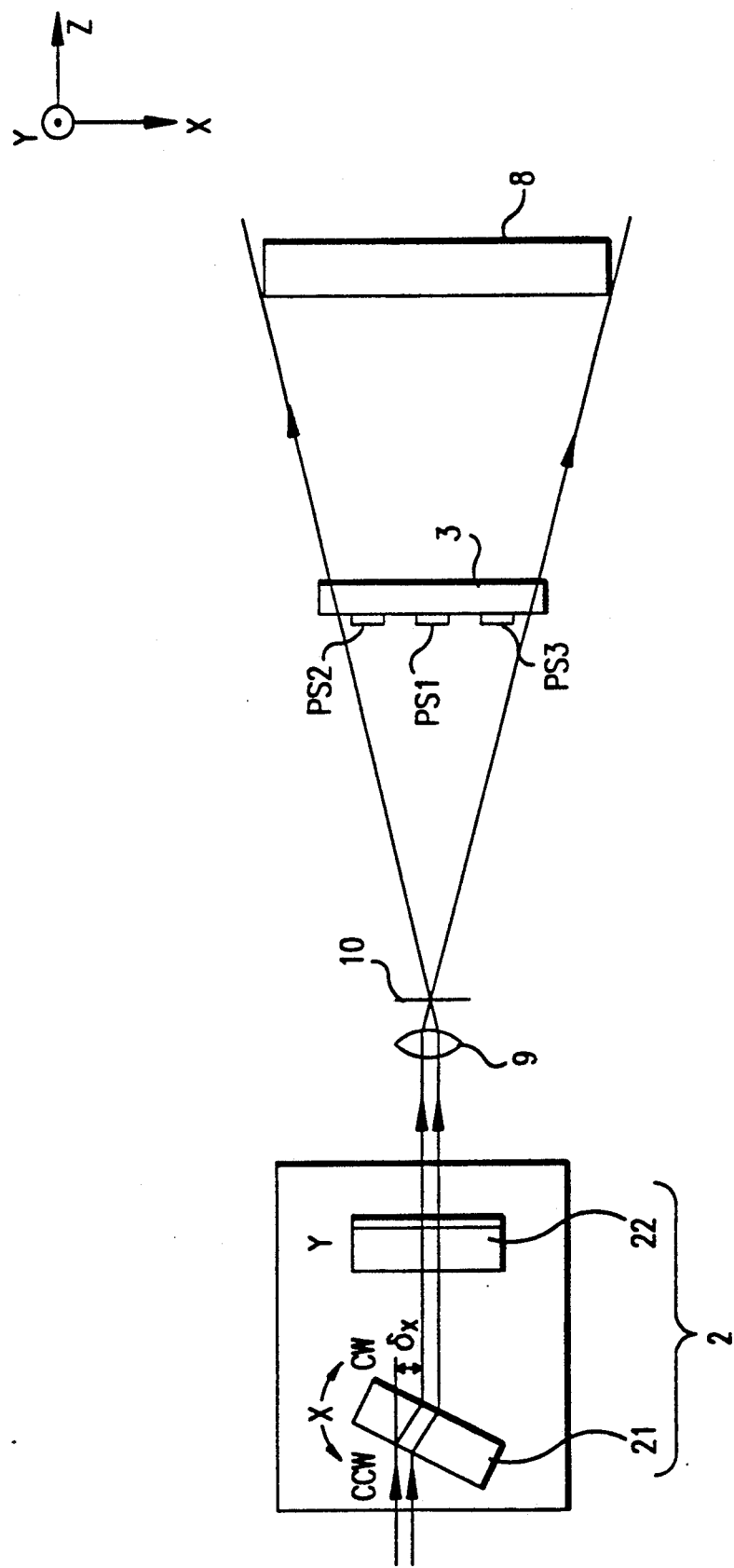
FIG. 6 is an illustration showing a geometric optical function of the beam shifter.

The luminous energy distribution sensor 3 includes five photosensors PS1-PS5 distributed vertically and horizontally crosswise and attached to a transparent plate 30 as shown in FIGS. 5 and 6. As is well known in the art, a laser beam has a Gaussian distribution of luminous energy, a pattern of which is unchanged even though the laser beam is shifted with respect to the luminous energy distribution sensor 3. Accordingly, a direction of a shifting or deviation of a converged laser beam can be recognized from the differences in strength between signals from the center photosensor PS1 and the side photosensors PS2, PS3, PS4 and PS5. Actually, the controller 5 detects a horizontal or X direction of a shift of the laser beam Lb' based on the differences between left and right deviations PL and PR. The left deviation of the laser beam Lb' is represented by the difference in strength between signals P1 and P4 from the center photosensor PS1 and the left side photosensor PS4. The right deviation of the laser beam Lb' is represented by the difference in strength between signals P1 and P5 from the center photosensor PS1 and the right side photosensor PS5. Similarly, the controller 5 detects a vertical or Y direction of a shift of the laser beam Lb' based on the differences between upward and downward deviations PU and PD. The upward deviation of the laser beam Lb' is represented by the difference in strength between signals P1 and P2 from the center photosensor PS1 and the upper side photosensor PS2. The downward deviation of the laser beam Lb' is represented by the difference in strength between signals P1 and P3 from the center photosensor PS1 and the lower side photosensor PS3. The controller 5 actuates the drive mechanisms 6A and 6B to turn the horizontal beam shift means 21 about the axis Xy and the vertical beam shift means 22 about the axis Yx, respectively, until the laser beam Lb' is shifted in the horizontal and vertical directions sufficiently to cancel the deviation or to reduce the deviation to an allowable extent.

Figure 7:
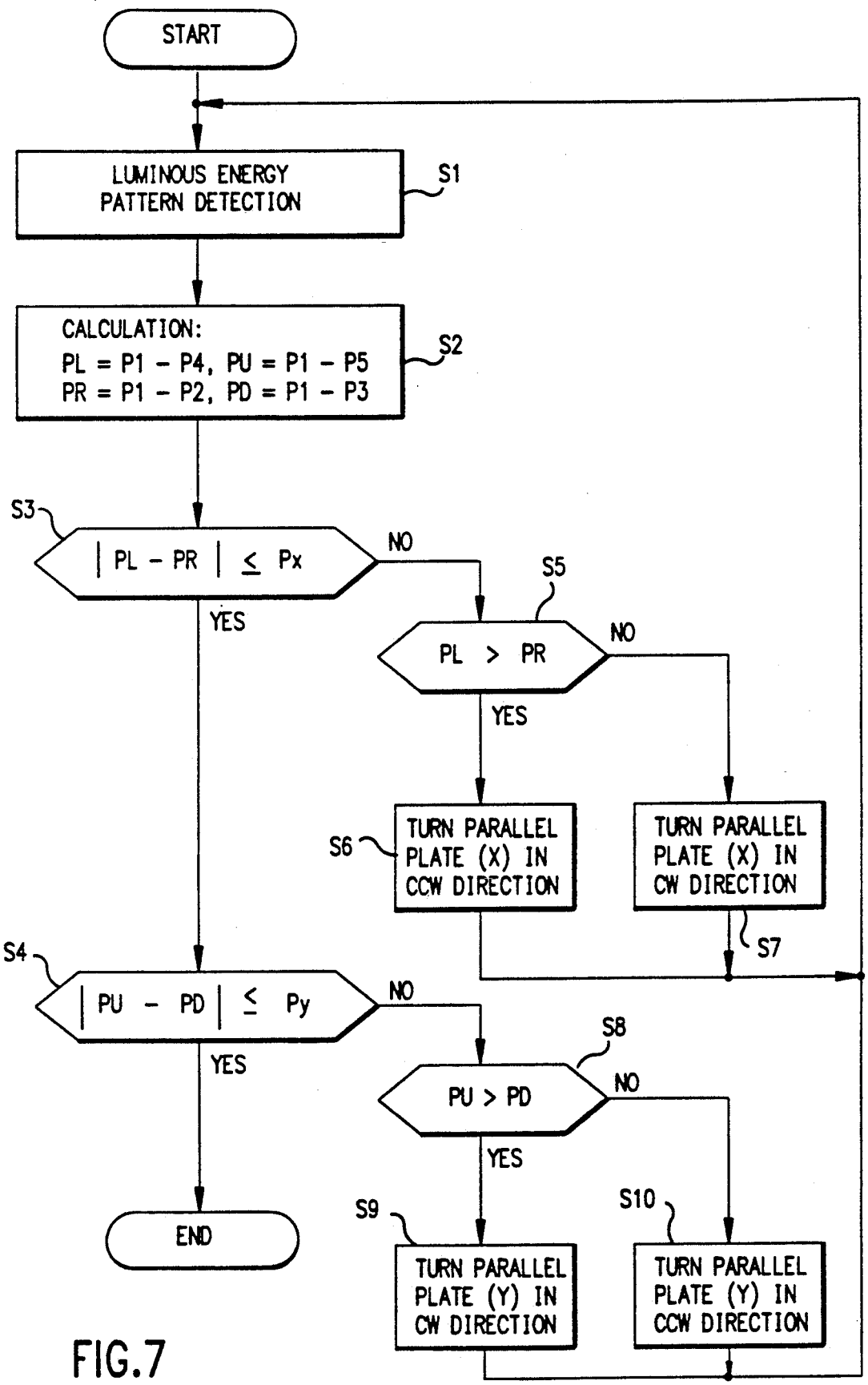
FIG. 7 is a flow chart illustrating a beam shift control routine.
Figure 8:
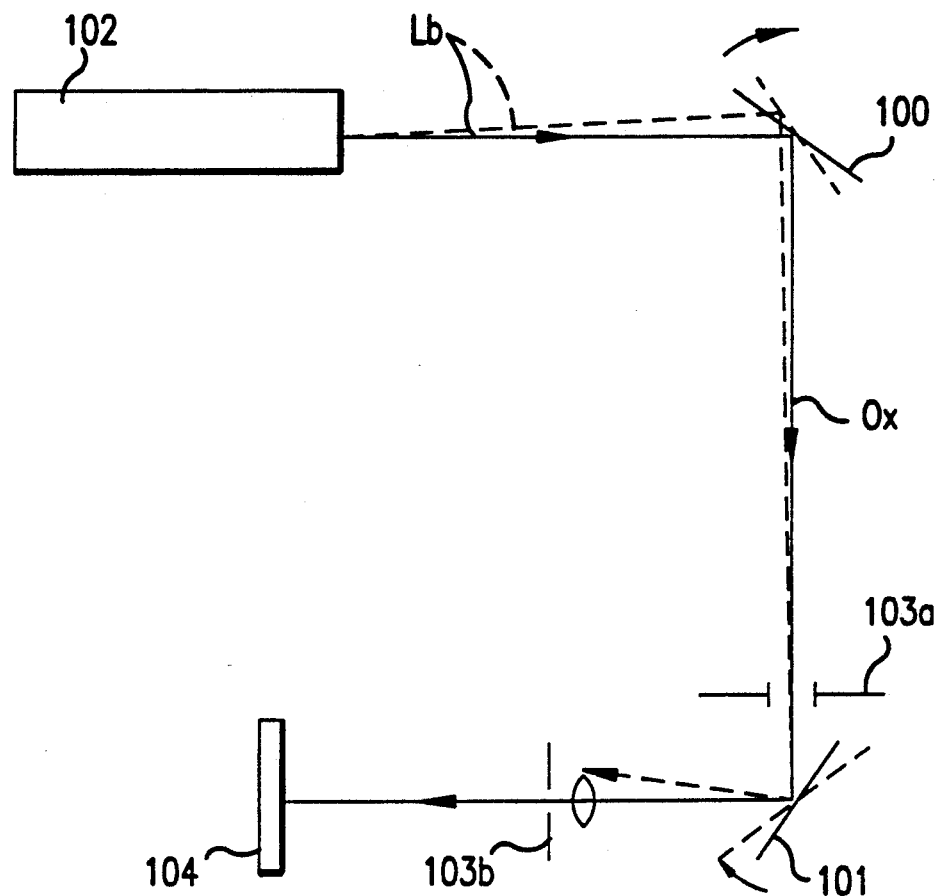
FIG. 8 is a schematic illustration of a prior art beam shifting device.

The beam shift operation of the beam shifter 2 depicted in FIGS. 1 and 2 will be best understood by reviewing FIG. 7, which is a flow chart illustrating a beam shift feedback control sequential routine for the central processing unit (CPU) of the controller 5. Programming a computer is a skill well understood in the art. The following description is written to enable a programmer having ordinary skill in the art to prepare an appropriate program for the CPU The particular details of any such program would be of course depend upon the architecture of the particular computer selected.

Before performing the beam shift feedback control, all optical elements are optically aligned between the laser 7 and the object 8. Then, after exciting the laser 7 to generate a laser beam Lb, the luminous energy sensor 3 monitors a distribution pattern of luminous energy of the beam Lb diverged by the diverging lens 9 on the transparent plate 30 and provides signals P1-P5 from the respective photosensors PS1-PS5 which are representative of luminous energy at positions, in which the photosensors PS1-PS5 are located, to the controller 5 through the signal entry interface 4 at step S1. Based on the signals P1-P5, the controller 5 determines deviations in X and Y directions by performing the following calculations at step S2:

Left deviation PL in X direction: PL=P1-P4
Right deviation PR in X direction: PR=P1-P5
Upward deviation PU in Y direction: PU=P1-P2
Downward deviation PD in Y direction: PD=P1-P3

Thereafter, a decision is made at step S3 whether or not the absolute difference between the left deviation PL and the right deviation PR is equal to or less than an allowable horizontal deviation Px. If the answer to the decision is "YES," this indicates that the beam is horizontally centralized or has only a horizontal deviation within the allowable horizontal deviation Px, another decision is made at step S4 as to whether or not the absolute difference between the upward deviation PU and the downward deviation PD is equal to or less than an allowable vertical deviation Py. If the answer to the decision is "YES," this indicates that there is no serious vertical deviation caused in the beam, i.e. the beam is both horizontally and vertically centralized or has only horizontal and vertical deviations within the allowable horizontal and vertical deviations Px and Py, then, the routine calls return.

However, if the answer to the decision made at step S3 concerning horizontal deviations is "NO," this indicates that the beam deviates beyond the allowable horizontal deviation Px, then a decision is made at step S5 whether or not the left deviation PL is larger than the right deviation PR. According to the answers to the decision, the horizontal and vertical beam shift means 21 and 22 of the beam shifter 2 are turned to correct the horizontal deviation of laser beam Lb.

Specifically, if the answer to the decision concerning the relative magnitude of left and right horizontal deviations made at step S5 is "YES," this indicates that the beam horizontally deviates left more than right, then, the horizontal beam shift means 21 is turned by the reversible motor 61A in the counterclockwise direction (CCW) with respect to the center axis of rotation Xy, as viewed in FIG. 2, through a specified slight angle $\Theta_x$ so as to shift the beam right. Thereafter, through the steps S1-S3, another decision is made at step S5 whether the horizontal deviation (PL-PR) is still larger than the allowable horizontal deviation Px. As long as the answer to the decision made at step S3 is "NO," the horizontal beam shift means 21 is turned by the reversible motor 61A in the counterclockwise direction (CCW) step by step through the specific slight angles $\Theta_x$. When the beam is horizontally centralized or placed within the allowable horizontal deviation Px, the answer to the decision made at step S3 becomes "YES."

On the other hand, if the answer to the decision concerning the relative magnitude of left and right horizontal deviations made at step S5 is "NO," this indicates that the beam horizontally deviates right more than left, then, the horizontal beam shift means 21 is turned by the reversible motor 61A in the opposite, i.e. clockwise, direction (CW) with respect to the center axis of rotation Xy through the specified slight angle $\Theta_x$. These steps S1 through S3, S5 and S7 are repeated until the beam is horizontally centralized or placed within the allowable horizontal deviation Px.

If the answer to the decision concerning vertical deviations made at step S4 is "NO," this indicates that the beam vertically deviates beyond the allowable vertical deviation Py, then a decision is made at step S8 whether or not the upward deviation PUy is larger than the downward deviation PDy. If the beam vertically deviates upward more than downward, i.e. if the answer to the decision made at step S8 is "YES," then, the vertical beam shift means 22 is turned by the reversible motor 61B in the counterclockwise direction (CCW) with respect to the center axis of rotation Yx, as viewed from the right in FIG. 2, through a specified slight angle $\Theta_y$ so as to shift the beam downward. Thereafter, through the steps S1-S4, another decision, concerning the relative magnitude of upward and downward vertical deviations PUy and PDy is still larger than the allowable vertical deviation Py, is made at step S8. These corrective steps S8 and S9 are repeated until the beam is vertically centralized or placed within the allowable vertical deviation Py.

On the other hand, if the answer to the decision concerning the relative magnitude of upward and downward vertical deviations made at step S8 is "NO," this indicates that the beam vertically deviates downward more than upward, then, the vertical beam shift means 22 is turned by the reversible motor 61B in the opposite, i.e. clockwise, direction (CW) with respect to the center axis of rotation Xy through the specified slight angle $\Theta_x$. These steps S1 through S4, S8 and S10 are repeated until the beam is vertically centralized or placed within the allowable vertical deviation Py. In the manner described above, whenever the laser beam Lb shifts or deviates in two dimensions from an intended path, it is automatically shifted back or corrected so as to be directed to a target point of an object.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. A beam shifting device for directing a beam toward an object placed in an optical axis, said beam shifting device comprising:

first beam shifting means positioned in said optical axis and being able to turn about a first axis perpendicular to said optical axis for shifting said beam in a first direction;

second beam shifting means positioned in said optical axis and being able to turn about a second axis perpendicular to both said optical axis and said first axis for shifting said beam in a second direction perpendicular to said first direction;

luminous energy distribution detecting means for detecting a distribution of luminous energy of said beam in each of said first and second directions with respect to a plane perpendicular to said optical axis; and control means for determining deviations of said beam from said optical axis in said first and second directions based on said distributions of luminous energy and for driving said first and second beam shifting means so as to reduce said deviations of said beam in said first and second directions, respectively.

2. A beam shifting device as defined in claim 1, wherein each of said first and second beam shifting means comprises a transparent optical parallel plate.

3. A beam shifting device as defined in claim 1, wherein said luminous energy distribution detecting means comprises an array of photoelectric sensors arranged in said plane for detecting said distribution of luminous energy of said beam with respect to said plane.

4. A beam shifting device as defined in claim 1, further including means for moving said luminous energy distribution detecting means out of said optical axis.

5. A beam shifting device as defined in claim 1, wherein said control means includes feedback control means for stepwise turning each of said vertical and horizontal beam shifting means about its respective axis to reduce vertical and horizontal deviations of said beam.

* * * * *